(12) United States Patent
Huss et al.

(10) Patent No.: US 9,017,098 B2
(45) Date of Patent: Apr. 28, 2015

(54) ELECTRICAL MOUNT

(71) Applicants: Tim Huss, Napa, CA (US); John Carr, Napa, CA (US)

(72) Inventors: Tim Huss, Napa, CA (US); John Carr, Napa, CA (US)

( * ) Notice: Subject to any disclaimer, the term of this patent is extended or adjusted under 35 U.S.C. 154(b) by 0 days.

(21) Appl. No.: 13/743,295

(22) Filed: Jan. 16, 2013

(65) Prior Publication Data
US 2014/0199872 A1     Jul. 17, 2014

(51) Int. Cl.
*H01R 13/60*     (2006.01)
*H01R 24/00*     (2011.01)
*H02G 3/20*      (2006.01)
*F21V 23/06*     (2006.01)

(52) U.S. Cl.
CPC .............. *H01R 24/005* (2013.01); *H02G 3/20* (2013.01); *F21V 23/06* (2013.01)

(58) Field of Classification Search
CPC .. H01R 13/10; H01R 13/625; H01R 2103/00; H02G 3/20

USPC ................... 439/537, 334, 332, 656
See application file for complete search history.

(56) References Cited

U.S. PATENT DOCUMENTS 4,426,126 A * 1/1984 De Vos et al. ................. 439/572
8,506,134 B2 * 8/2013 Wilson et al. ................. 362/366

* cited by examiner

*Primary Examiner* — Phuong Dinh
(74) *Attorney, Agent, or Firm* — Gerald L. Robertson

(57) ABSTRACT

A combination female-oriented receiver with a mounting side and a receiving side configured to accept a male-oriented mount, the mounting side of the receiver electrically connected to a junction box, or a mounting plate, the receiving side having plates electrically connectable to either. The receiver has access points and a race to receive the male mount and a pin slot, the electrical plates positioned such that when corresponding conducting surfaces on the male mount are rotated in the race to a proper position, the the mount and receiver are electrically connected. The race further provides a weight-bearing surface to support the mount and the weight of an electrical fixture removably affixed thereto, further held in place by a spring-biased pin inserted at a non-normal angle into the receiver's pin slot.

4 Claims, 3 Drawing Sheets

ELECTRICAL MOUNT

FIELD OF THE INVENTION

The invention pertains to the field of electrical mounts and fixtures.

REFERENCE TO RELATED APPLICATIONS

This application is an original first filing; no provisional, continuation or other document has been filed with the United States Patent & Trademark Office by Applicants pertaining to this subject matter.

ACKNOWLEDGMENT OF GOVERNMENT SUPPORT

This invention was not developed with any type of government support. The government has no rights in Applicants' invention.

BACKGROUND OF THE INVENTION

Currently, in the construction trade, much labor is expended in "hard wiring" electrical fixtures onto electrical "boxes" normally referred to as "junction boxes", "j-boxes", "mounting plates", or other devices designed to provide electrical wiring from the appropriate circuit connected to the structure's electrical panel. With wiring so connected available at the point where an electrical device or fixture is to be located, as part of the installation, it is customary to provide a support for whatever device or fixture is to be so mounted.

In simple cases, a simple electrical outlet may be provided such that an electrical fixture fitted with a cord terminating with a plug may be affixed nearby and simply plugged into the outlet.

In most applications however, it is customary to hardwire the desired fixture to the circuitry, using the box itself or a mounting plate to secure the fixture to a ceiling for example, the box and mount assembly, having provisions for affixing the fixture thereto. In cases where fixtures have more weight, the box and mount assembly must have sufficient holding capacity in order that the fixture may be safely "hung."

In cases where fixtures have dynamic operating characteristics such as a ceiling fan, the junction box and mounting plate must be firmly affixed to the ceiling structure, such as firmly to a joist or rafter sufficient to withstand the inertial and centrifugal forces of the fan in operation. Furthermore, the operation of the fan over a period of years requires a mounting assembly of adequate design to withstand the dynamic forces for a period of years.

The hand wiring of such facilities requires a certain amount of skilled labor. Electricians are among the most highly trained of all craft labor. Working with electrical systems requires extensive training as the systems are dangerous to those working on or with them when energized, and equally important, the installation of such systems and their parts require specific knowledge to prevent shock, fire and even explosion when systems become energized or "live."

Because of the nature of electrical systems, the costs of hard wiring such fixtures is expensive. In the ordinary course of preparing a j-box, the box is nailed to a stud or joist and the wiring which has been located nearby is pulled into the box, the wires themselves, bundled and without prepared terminations.

If a fixture requiring a mounting plate is to be installed, the wires may be pulled through a hole in the mounting plate, and the mounting plate then fastened to the j-box. In order to mount the fixture, the fixtures electrical wires must be connected to the wires emanating from the j-box in correct fashion, usually employing twist on electrical caps to make the connection between each appropriate wire, be it positive, negative, neutral or common and ground.

This procedure takes time comprising several minutes to larger fractions of an hour depending on the ease of handling the fixture, whether a ladder is required, how many wires are involved and the general ease of which the fixture can be held during wiring, etc. Once the electrical connection is complete, the fixture must be finish mounted with any housing or other fascia to be included then assembled or fastened in place to complete the installation.

What is needed in general in the construction industry is a means of reducing the time involved in hard wiring and installing electrical fixtures.

Another relevant consideration is the amount of time it actually takes to replace a fixture when it has experienced some sort of failure, has become obsolete, or is to be discarded by virtue of an owner wishing to replace said fixture in the process of re-decorating or employing new lighting technologies.

As it stands for the most part, the reverse of the mounting procedure previously described is necessary.

Because of the amount of labor required to remove and replace lighting fixtures, owners are less inclined to do so and re-decorating is in some cases restricted when it comes to lighting fixtures as the cost of replacement is considered high when taking into account the labor associated with replacement.

What is needed is an improvement in fixture mounting technology decreasing the cost of changing lighting and other electrical fixtures allowing greater ease of changing fixtures without the traditional high cost of doing so.

While "quick disconnects" exist in the arena of hydraulics, in the electrical field, such quick disconnects are more prevalent in terminating small wire leads in controls, communications and switches, not for traditional electrical fixtures, save the insert and twist features of track lighting. To a lesser extent in the electrical field some extension cord similarities exist, but not to the extent needed in installing lighting fixtures.

SUMMARY OF THE INVENTION

Applicant has devised an electrical mount which substantially reduces the amount of time needed to both install and replace electrical fixtures. The invention is available both as an adaptation to existing fixture bases and/or mounting brackets & junction boxes, and as a new base design for lighting fixtures in general.

In one embodiment of Applicants' invention, a receiver is provided for installation onto a standard junction box. The receiver comprises a mounting side and a receiving side. Further provided is a means to attach to the j-box in the form of holes in standard configuration through which fasteners engage to secure the receiver to the j-box and/or a mounting plate.

The mounting side of the receiver has means for attaching the wires provided at the j-box prior to fastening the receiver in place.

The non-obverse or receiving side of the receiver is of female orientation to receive a mating or male-oriented mount which mount can be either adapted to an existing standard fixture or incorporated by design into a fixture base.

On the side of the receiver intended to mate with the male oriented mount module, access points to a substantially circular race or slot are provided inside which four rivet-secured conductive "plates" are in electrical communication with the wiring attached on the obverse side. These plates provide terminations for electrical connection corresponding to Switch Leg 1, Switch Leg 2, Neutral and Ground at the j-box.

The receiver has incorporated therein a substantially circular race or slot symmetric thereto and of sufficient height for a corresponding set of "dog ears" having corresponding conductive surfaces provided on the male mount's flange to be in electrical communication with the four plates of the receiver. A retractable pin on said mount provides locating and locking function between both receiver and mount in a corresponding slot in said receiver, typically at an angle non-normal to said flange.

Access points corresponding to the shape of said dog ears allow the mount module be inserted into to keyways provided in the receiver's slot like race for rotating into place at the appropriate electrical connection points. The slide actuated pin serves to lock the receiver and mount together in position to complete the electrical connection and prevent further rotation.

In another embodiment of Applicants' invention, said male mount is incorporated into the base of the fixture itself underneath the base fascia to be exposed for removal later if necessary.

Noteworthy is the size of the race mating surface defined by the dog ears in contact therewith, recognizing the need for the mating surface to support sufficient weight and stress of a fixture of dynamic characteristics such as a ceiling fan. Additional retention means for such an application may comprise a hole provided in said male mount to accept a set screw in a corresponding tapped hole in said female receiver.

Applicants' invention also provides the quick release or removal of the fixture by simply exposing the male mount, retracting the pin and rotating the mount within said receiver's race such that said dog ears are opposite the corresponding accesses allowing removal of said mount and fixture from said receiver without the time and cost of unwiring said fixture from a standard j-box.

In one embodiment of Applicants' invention, a ball and detent is employed in order to provide a "stop" or final rotated position. Typically, the ball would be in the receiver, the detent having a relieved edge provided in the male mount. When rotated, the detent engages the ball, clicking into a retained position as the ball projects outward. In order to remove the mount, the ball is pressed and the mount rotated such that the ball becomes further depressed upon engaging the relieved edge of the detent, thereby depressing fully so the mount may be rotated free of the receiver. Any number of retaining means such as clip and slot, ball and detent or other releasable retaining means may be employed with similar result.

In this instance, another fixture with either the mount affixed or designed into the base thereof may be simply inserted into said receiver, rotated into position and locked in place, the time required therefore representing a significant savings over traditional replacement time and cost.

Applicants' invention also affords the quick change of fixtures facilitating everything from replacement for repair to employing fixtures based on seasons such as Christmas or simply redecorating.

DETAILED DESCRIPTION OF THE INVENTION

Figure 1:
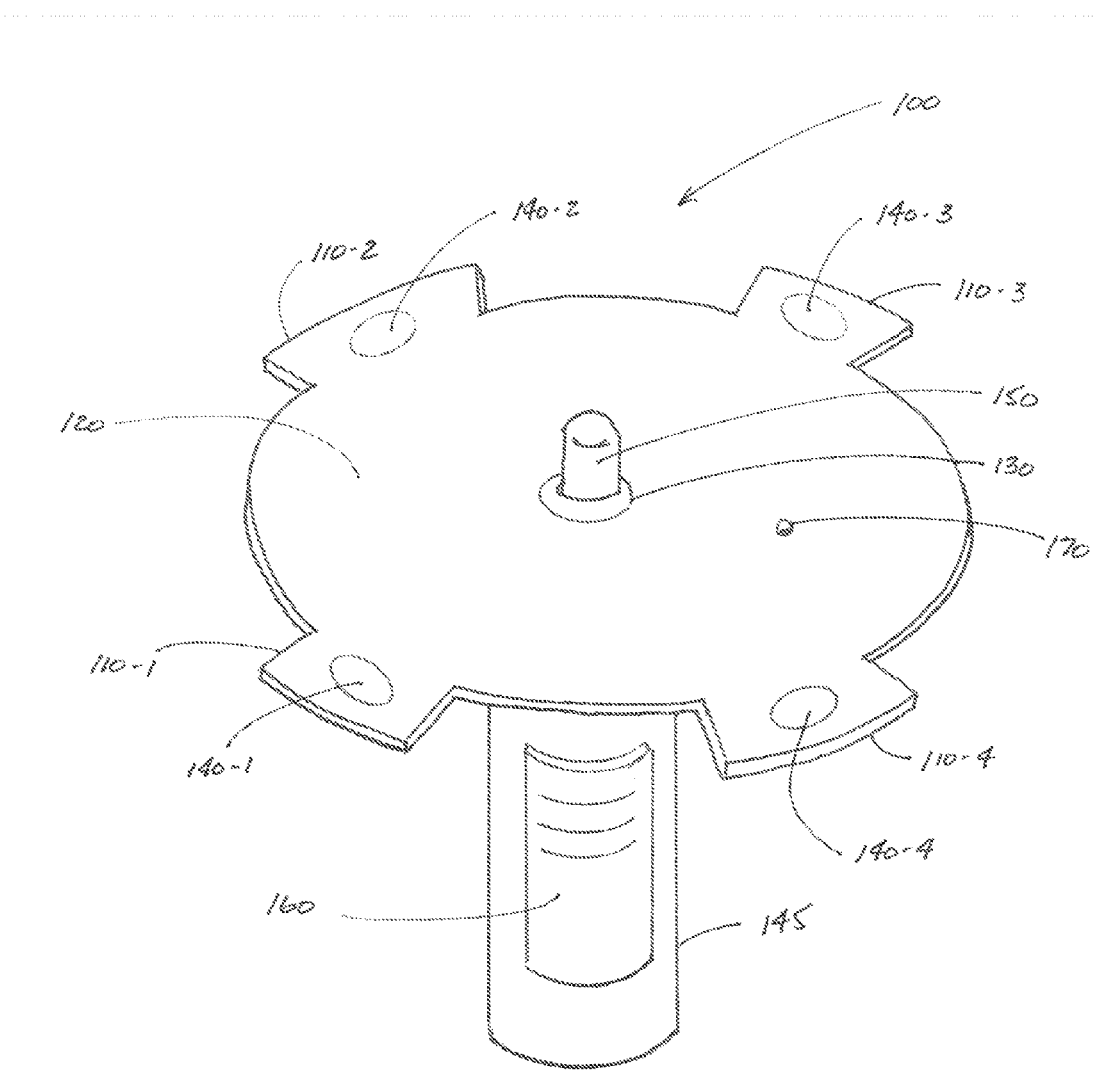
FIG. 1 is plan view of the side of the male-oriented mount which communicates electrically with the receiver of Applicant's invention.

FIG. 1 is a plan view of male-oriented mount 100 having at least one dog ear, in embodiment shown, four dog ears 110-1, 110-2, 110-3 and 110-4, protruding in planar fashion from substantially flat flange-like non-conducting surface 120. Through-bore 130 provides access for pin 150, typically projecting from said surface 120 at an angle of less than 90 degrees. Conducting surfaces 140-1, 140-2, 140-3 and 140-4 are located on surface 120 in order that they may be in electrical communication with corresponding electrical communications of an electrical fixture (not shown) to which mount 100 will be removably affixed. Stem 145 provides a mounting means for such an electrical fixture or may simply be an integrated extension of said fixture in an alternate embodiment.

Pin 150 slides through bore 130, actuated by slide 160, to which said pin is attached with an attachment means typically through a slot in said stem (not shown). A spring (not shown) biases said pin 150 in the extended position, said slide acting to retract said pin for insertion, locking and removing said mount 100 to its corresponding female-oriented receiver shown in FIG. 2. Many spring/pin/slide configurations are available to perform this function, any of which may be employed. Not shown is the means of electrical connection between said fixture (not shown) and conducting surfaces 140-1, 140-2, 140-3 and 140-4. Multiple means may be employed such as buswork integral to said flange-like surface, with terminations in said stem for connection with said fixture. Similarly, wiring may be provided on the non-mating side of said male mount, with a small bus to avoid interference with the mating surface defined by the dog ears and the receiver's race, or other standard means known in the industry.

Figure 2:
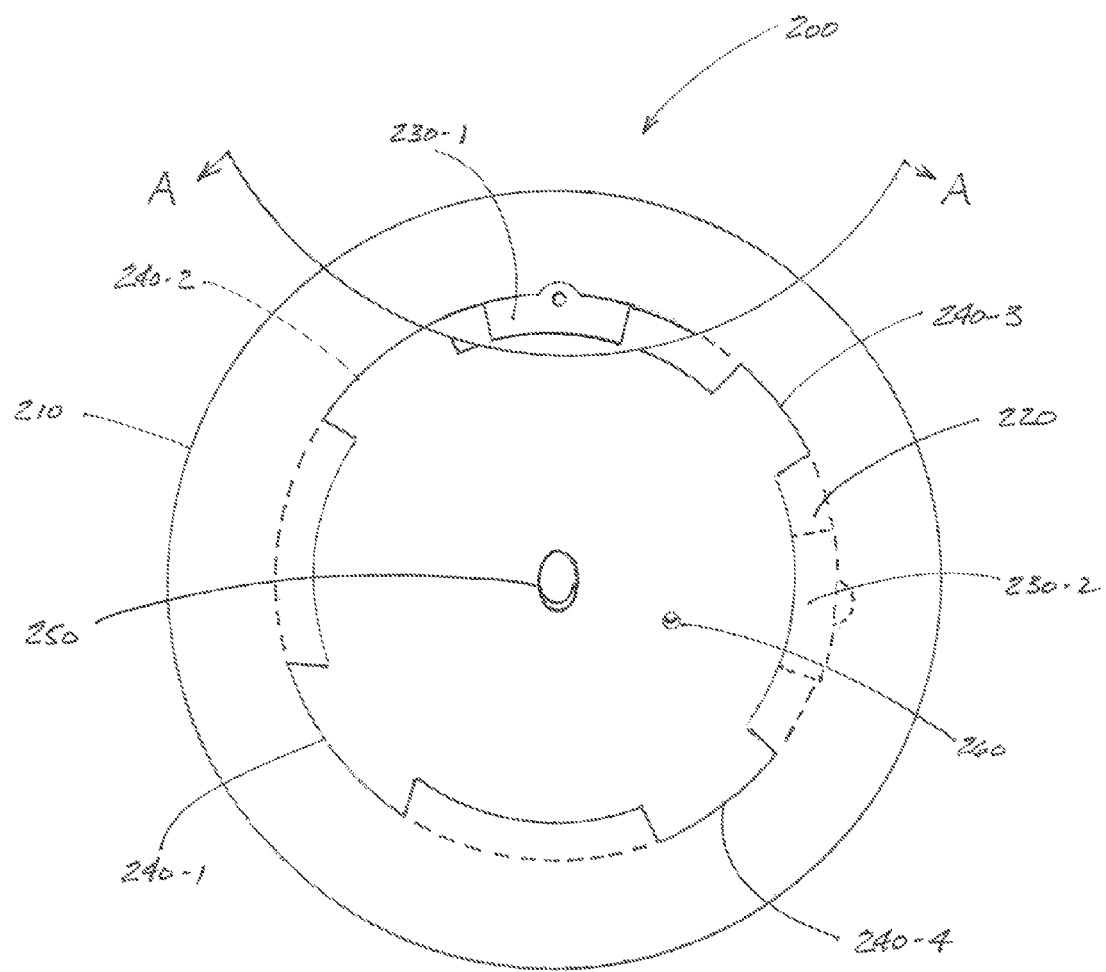
FIG. 2 is a plan view of the receiving side of the female oriented receiver.

FIG. 2 shows the mating side of female-oriented receiver 200, said receiver comprising a circular plate 210 fashioned with a substantially circular slot therein defining a race 220. Said race 220 defines at least 1 and in the embodiment shown 4 such race portions each having affixed thereto contact surfaces in this case in the form of contact plates 230-1, 230-2, 230-3 (not shown) and 230-4 (not shown). Contact plates 230-1, 230-2, 230-3 and 230-4 are in electrical communication with wires provided from a junction box as provided in FIG. 3 and typically affixed to said race 220 via rivets. When the male mount of FIG. 1 is inserted into said receiver 200 and rotated into position, said conducting plates 230 then become in electrical communication with the appropriate corresponding electrical wires of said fixture (not shown) when said dog ears 110-1, 110-2, 110-3 and 110-4 of said mount 100 (shown in FIG. 1) are inserted into keyways 240-1, 240-2, 240-3 and 240-4 contacting said race 220 of said receiver 200. These keyways 240 typically have one of said keyways either longer or of different shape from said other keyways, thereby providing a way to orient the insertion of male mount 100 of FIG. 1. The engagement of said dog ears with said corresponding area of said race defines mating surfaces designed to support the load of said fixture (not shown) attached to said male mount 100 of FIG. 1 in said slot of receiver 200. Typically, embodiments of Applicants' invention provide three to four plates to allow for electrical connection, and where applicable, the fourth plate for electrical connection for switching or operational control of said fixture.

Pin slot 250 is shown, positioned to accept pin 150, shown in FIG. 1, to finally position and lock said mount 100 (FIG. 1) into position into said receiver 200. Tapped hole 260 is provided in said receiver to accept a set screw providing additional retention means to male mount 100.

Figure 3:
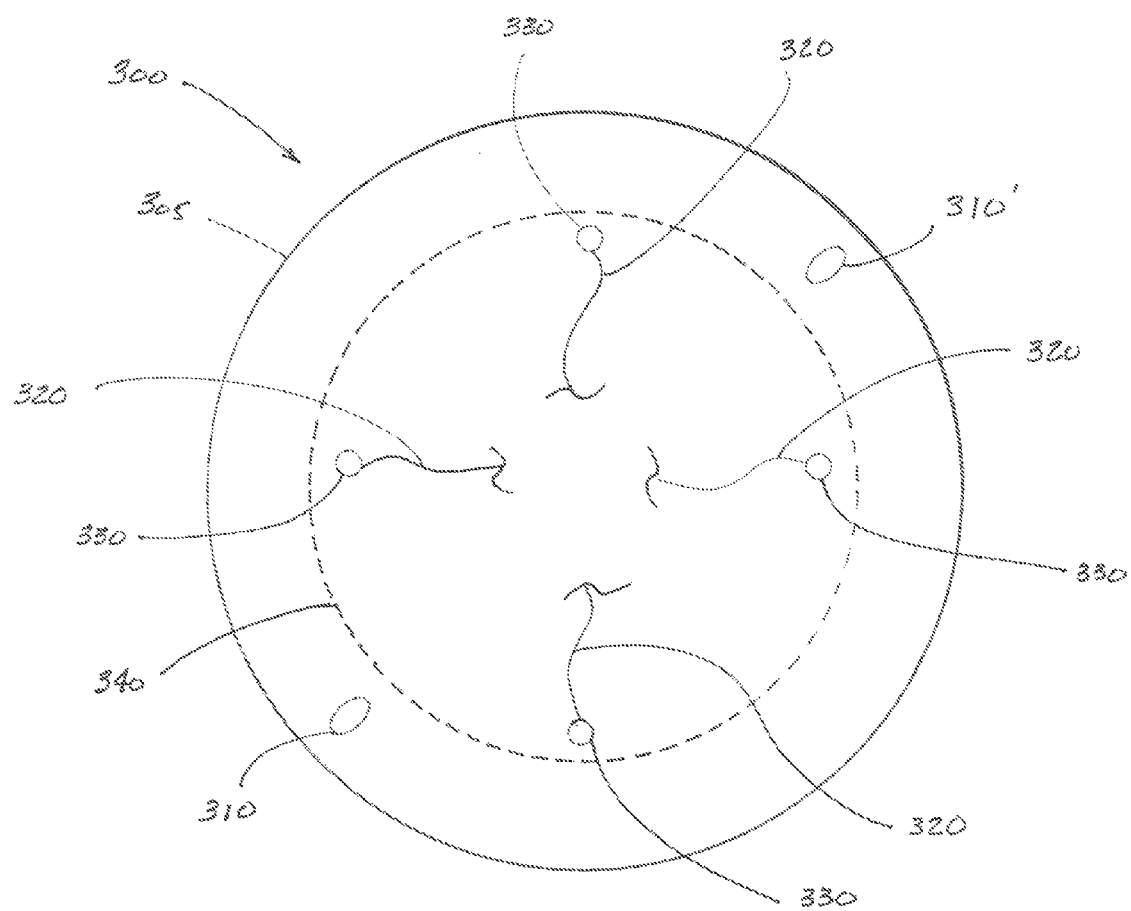
FIG. 3 is a plan view of the mounting side of said receiver.

FIG. 3 is a plan view of the mounting side of female-oriented receiver 300, defined by a plate 305 (the obverse shown as plate 210 in FIG. 2). Plate 305 is provided with at least one mounting means, in this figure, two such means 310 and 310' for removably fastening said receiver to a standard junction box or fixture mounting plate (not shown). Wires 320 to be joined with wires (not shown) from said junction box (also not shown) terminate at at least one contact point 330 for electrical communication with conducting plates 230 shown in FIG. 2 of said receiving side of receiver 300. Hidden outside diameter of race 220 in FIG. 2 is shown by dotted line 340.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An improved electrical mount comprising:
   a male mount having exposed contact points;
   a female-oriented receiver having a mounting side and a receiving side, said mounting side removably affixed to and in electrical communication with a junction box or mounting plate, said junction box or mounting plate electrically connected to an electrical panel, said female-oriented receiver having a slot provided with contact surfaces in electrical communication with said mounting side, said slot in electrical communication with said male mount when said male mount is rotated to a position inside said slot, said male mount having provision for electrical communication with an electrical fixture either as a retrofit thereto or having been integrated therewith.

2. The invention of claim 1 wherein:
   said male mount may be removably affixed in said female-oriented receiver.

3. The invention of claim 2 wherein keyways are provided in said slot and said male mount is shaped with dog ears sized to pass through said keyways such that said male mount may be inserted into said slot and upon a predetermined amount of rotation, retained in said female-oriented receiver.

4. An improved electrical mount comprising:
   a female-oriented receiver having a mounting side and a receiving side;
   said mounting side comprising a plate having at least one hole to receive a fastening means for affixing said receiver to a j-box or mounting plate, at least one contact point in electrical communication with said receiving side of said female-oriented receiver, said contact point having provision for electrical communication also with said j-box or said mounting plate;
   said receiving side comprising a plate having fashioned therein a substantially circular slot defining a race, at least one contact surface provided on said race in electrical communication with said mounting side of said female-oriented receiver, a pin slot projecting inward at an angle non-normal to the plane of said female-oriented receiver, said receiving side further comprising at least one keyway for access to said race;
   a male mount comprising a hollow stem and a non-conductive flange-like surface, said surface forming at least one dog-ear having provided thereon a conducting surface, said conducting surface in electrical communication with conducting means projecting through said stem;
   said male mount further comprising a through bore in said flange to accept a pin retained in said stem, said pin biased in an extended position by a spring, said spring affixed to a slide via a slot in said stem allowing said slide to operate said pin to engage said pin slot in said female-oriented receiver;
   said keyways of said female-oriented receiver sized to accept said dog ears such that when said male mount is inserted in said female-oriented receiver, said male mount may be rotated in said race to a position where said pin engages said pin slot, projecting therein thereby retaining said male mount firmly in said race with said contact surface of said female-oriented receiver being in electrical communication with said conducting surface of said male mount.

\* \* \* \* \*